(No Model.)
C. C. COLEMAN.
CANE PLANTING MACHINE.
No. 279,709. Patented June 19, 1883.
Fig: 1.
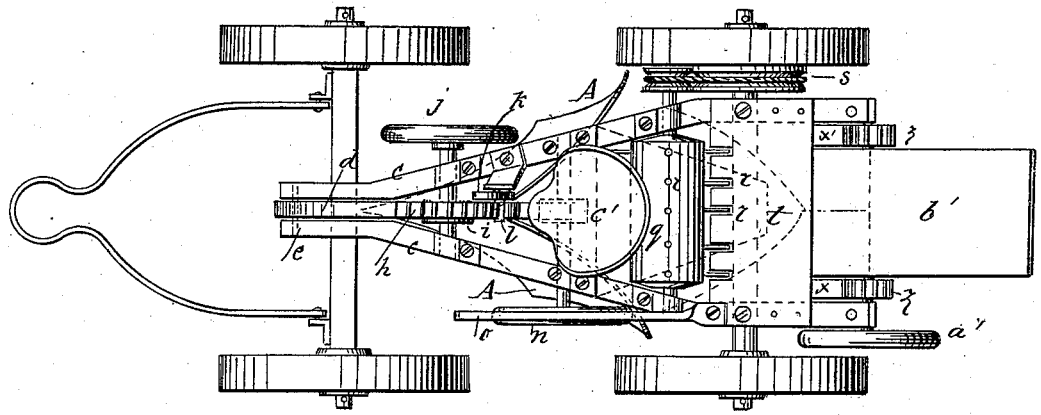
Fig: 2.
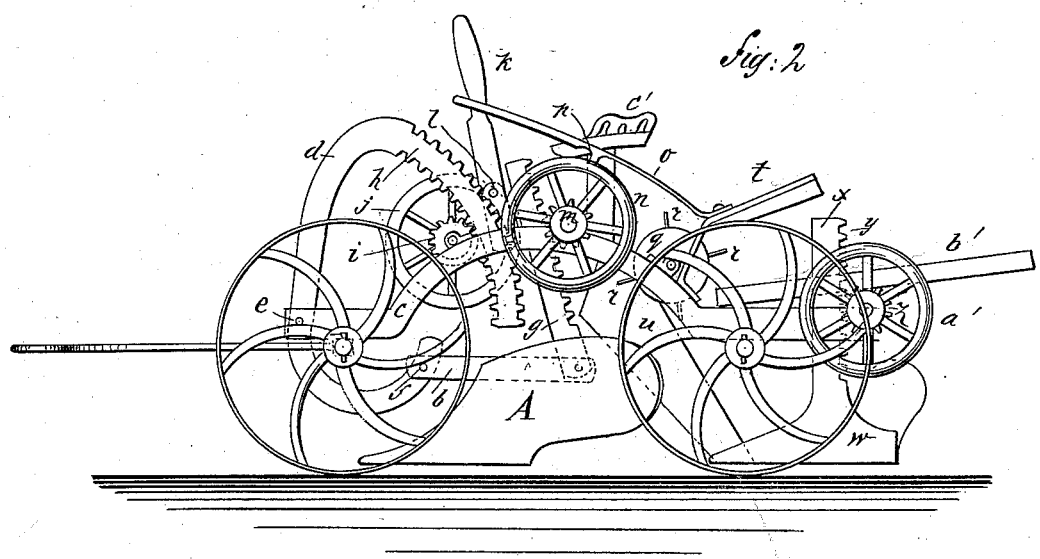
WITNESSES:
Chas. Nida
C. Sedgwick
INVENTOR:
C. C. Coleman
BY Munn & Co.
ATTORNEYS.

UNITED STATES PATENT OFFICE.

CHARLES C. COLEMAN, OF HONOLULU, HAWAIIAN ISLANDS.

CANE-PLANTING MACHINE.

SPECIFICATION forming part of Letters Patent No. 279,709, dated June 19, 1883.

Application filed August 3, 1882. (No model.)

*To all whom it may concern:*

Be it known that I, CHARLES C. COLEMAN, of Honolulu, Oahu, Hawaiian Islands, have invented a new and Improved Cane-Planting Machine, of which the following is a full, clear, and exact description.

My invention consists of a furrow-opening plow, seed-cane-dropping mechanism, and covering-plows or scrapers, arranged on a truck for being drawn along the ground for planting the seed-cane, the said plow and dropping and covering mechanisms being contrived and arranged for joint operation and for regulating and adjusting, all as hereinafter fully described.

Reference is to be had to the accompanying drawings, forming part of this specification, in which similar letters of reference indicate corresponding parts in both the figures.

Figure 1 is a plan view of my improved cane-planting machine, and Fig. 2 is a side elevation.

A represents a large furrowing-plow, which I provide with a short beam, $b$, by which I suspend the plow from the frame $c$ of a truck by the crooked lever $d$, pivoted to the frame $c$ at $e$, and pivoted to the front end of the beam at $f$, and by the hanger-bar $g$, pivoted to the rear end of the beam. The lever $d$ has a toothed section, $h$, circumferential to its fulcrum $e$, and geared with the pinion $i$ of a hand-wheel, $j$, for raising and lowering the point of the plow. Said section $h$ is also toothed on the back for being set high or low by the lever $k$, and a stop, $l$, on it, which swings in and out of the notches to set the lever $d$, as desired. The hanger-bar $g$ is also toothed and geared with the pinion $m$ of another hand-wheel, $n$, for raising and lowering the rear of the plow. The stop-lever $o$ and stop-catch $p$ thereon, arranged in connection with wheel $n$, having notches for the stop, serve to lock and hold the rear end of the plow in any required position. The plow A is drawn mainly by the lever $d$, which it will be seen is favorably arranged for that purpose, and it will be noted that the contrivances for adjusting the plow facilitate the shifting of it, for plowing deep or shallow or for running above the ground, in the most ready manner. Behind the furrowing-plow a seed-cane-dropping cylinder, $q$, is located, said cylinder being armed with teeth or brushes $r$, and geared with one of the truck-wheels by a belt, $s$, and pulleys, to be rotated in front of the table $t$ for picking or brushing off the pieces of seed-cane, placed thereon by an attendant, into a spout, $u$, in which the pieces of cane are caused to turn lengthwise to the spout by the shape and dimensions of it, and are discharged in that way into the furrow opened by plow A, to be covered by the scrapers $w$, which may consist of plows, as here shown, rotary brushes or scrapers, or other approved devices for plowing, scraping, raking, brushing, or otherwise returning the earth into the furrow and covering the cane. In this case I have arranged the stocks $x$ of these plows with teeth $y$, gearing with pinions $z$ on a shaft provided with a hand-wheel, $a'$, for raising and lowering them, the said hand-wheel or pinions to be provided with any approved stop device to lock and hold the plows as required.

$b'$ represents a platform, mounted on the rear end of the frame, for carrying the supply of seed-cane from which to replenish the table from time to time as the brush takes it away. $c'$ represents the driver's seat, suitably arranged to enable him to attend to the furrowing-plow, while another attendant, standing on platform $b'$, will attend to the rear plows and supply the seed to the dropper. Platform $b'$ may be raised up to the level of feed-table $t$, another place being provided for the attendant to stand on.

Having thus fully described my invention, I claim as new and desire to secure by Letters Patent—

1. The combination of a furrowing-plow, seed-cane-dropping cylinder or drum armed with points or brushes, seed-table, and cover-plows, the said elements being organized in a machine, substantially as described.

2. The combination of a furrowing-plow, A, seed-cane-dropping cylinder or drum $q$, armed with points or brushes $r$, inclined slotted seed-table $t$, platform $b'$, and covering-plows $w$, substantially as described, and for the purpose set forth.

3. The combination, with the furrowing-plow A, suspended from the truck-frame by the short beam $b$, of the lever $d$, curved at both ends, toothed at its upper end, and pivoted to the truck-frame $e$ and to the front end of the beam at f, toothed hanger g, pivoted to the rear end of the beam, and hand-wheels j n, carrying pinions, substantially as described, whereby both ends of the plow can be raised and lowered simultaneously, as set forth.

4. The plow-suspending lever d, pivoted to the front end of the truck-frame at e, connected to beam b at f, and having the circumferential toothed section h, in combination with a pinion, hand-wheel, and stop device, substantially as described.

5. The combination of feed-table t, toothed roller q, and spout u with a furrow-opening plow, A, substantially as described.

6. The combination of feed-table t, toothed roller q, and spout u with covering-plows or scrapers w, substantially as described.

7. In a seed-cane-planting machine, the combination, with the furrowing-plow A and toothed roller q, of the inclined slotted table t, spout u, and platform b', substantially as described, and for the purpose set forth.

CHARLES CORSON COLEMAN.

Witnesses:
F. L. CLARKE,
C. H. BRICKWOOD.